(12) United States Patent
Furuichi et al.

(10) Patent No.: US 6,289,399 B1
(45) Date of Patent: Sep. 11, 2001

(54) COMPUTER AND PARAMETER SETTING METHOD

(75) Inventors: Sanahiro Furuichi, Kawasaki; Toru Aihara, Yokohama, both of (JP)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/140,206

(22) Filed: Aug. 26, 1998

(30) Foreign Application Priority Data

Aug. 26, 1997 (JP) .................................................... 9-230046

(51) Int. Cl.⁷ .................................. G06F 3/00; G06F 1/32
(52) U.S. Cl. .............................. 710/6; 710/16; 713/320; 713/340
(58) Field of Search .................................... 713/300, 310, 713/320, 324, 330, 340; 710/129, 6, 16, 42–43

(56) References Cited

U.S. PATENT DOCUMENTS

| | | | |
|---|---|---|---|
| 5,483,656 | * 1/1996 | Oprescu et al. | 713/300 |
| 5,560,022 | * 9/1996 | Dunstan et al. | 713/300 |
| 5,905,900 | * 5/1999 | Combs et al. | 713/320 |
| 5,909,585 | * 6/1999 | Shinmiya | 713/322 |
| 5,920,728 | * 7/1999 | Hallowell et al. | 713/340 |
| 5,925,134 | * 7/1999 | Solomon | 713/324 |
| 5,944,829 | * 8/1999 | Shimoda | 713/324 |
| 5,958,058 | * 9/1999 | Barrus | 713/320 |
| 5,964,879 | * 10/1999 | Dunstan et al. | 713/340 |

* cited by examiner

Primary Examiner—Robert Beausoleil
Assistant Examiner—Raymond N Phan
(74) Attorney, Agent, or Firm—Ronald L. Drumheller (57) ABSTRACT

To provide power management for a computer, the computer includes: a resource manager for examining a running application and a usage status of an examination object device; and a policy manger for receiving, from the resource manager, information about the running application and the usage status of the examination object device, and for selecting a job type corresponding to the information, in a plurality of job types predetermined for the running applications. The resource manager receives, from the policy manager, the selected job type, and sets a parameter of a control object device thereinto. The parameter of the control object device is predetermined for the selected job type. A job type reported by the policy manager may be a job type name or a set of operating modes of the control object device.

8 Claims, 6 Drawing Sheets

COMPUTER AND PARAMETER SETTING METHOD

BACKGROUND OF THE INVENTION

1. Field of the Invention

The present invention relates to power management of a computer.

2. Related Art

According to a conventional power management method, power management is usually performed by individual devices or by individual device groups. The primary control object is a CPU, an LCD or an HDD, and conventionally the following power management methods are performed.

(a) CPU

Generally, it is possible to reduce the amount of power consumption by reducing the speed of the performance (clock frequency). A mode for halting an internal clock (such as stop-grant mode in Pentium), or internal and external clocks (such as stop-clock mode in Pentium) of a CPU has been prepared for the Pentium (a trademark of Intel Corp.) processor, etc. To reduce power consumption, a slow-clock emulation for reducing the clock frequency is performed by halting the clock for a specific period of time. An OS supporting APM (Advanced Power Management) monitors the dispatched state of a task, and halts the clock of the CPU when the OS determines no task is to be executed.

(b) LCD

The ratio of energy consumed by an LCD panel to the total of the required energy is relatively large, and reducing the luminance is a very effective power saving method. It should be noted, however, that generally there is a deterioration in usability when the luminance is reduced. A method is frequently employed whereby the input state of a keyboard is monitored, and the LCD is turned off when it is determined there is no keyboard operation by a user.

(c) HDD

Since a hard disk is not accessed constantly, the halt of the rotation of the disk when there is no disk access is a very effective power saving method. Generally, a method for halting the rotation of the disk is employed when no disk access has occurred for a period of time set by a timer. It should be noted, however, that if the disk has been halted when accessing to the disk, a large amount of power is required for spin-up to activate the disk, and an actual disk access will be delayed. It is, therefore, difficult to appropriately set the above function when frequent disk accesses are required.

The above described power management process for individual devices, or for individual device groups has the following problems: (1) the setting of a parameter for power management is fixed, regardless of the job type that represents the job status of the entire system, including that of present running application programs. Once the value of the parameter has been set, the specified value is usually not changed until the value is specified again. Some notebook computers have control programs that temporarily change the value of the parameter when an event occurs. However, this change is based merely on the usage history of an individual device, and the value of the parameter is not varied in accordance with the job type. (2) the conventional power management method is not flexible because the control of power savings for individual devices is performed completely independently. Although the power consumed by individual devices can be reduced, the total power reduction in a device assembly is not taken into account. Therefore, as a result, an unwanted deterioration of the performance and useability in a specific job type occurs.

As a power management procedure for the entire system, a method whereby, when a specific event occurs, the system shifts between states, such as a normal state, a rest state, a standby state, and a suspend state is disclosed in Japanese Unexamined Patent Publications Nos. Hei 8-36445, 7-302133 and 7-044286. In these publications, the type of application being executed is not taken into account, and the state transition is performed based merely on one predefined device usage status or on an event caused by it, and the control of the device is executed in response to the state transition. The type of application being executed is not taken into account because the methods described in the publications are based on the theory that the system is in the normal state so long as an application program is being executed, and it is therefore assumed that in such a case, the performance of the power saving process either not is required or will result in the occurrence of a problem. Thus, no state transition occurring during the execution of the application program is described in the above publications. Furthermore, the described methods provide the normal state and the suspend state and etc. only for the power reduction. But, no explanation is given for a viewpoint in which by performing power management which increases the power consumption in a job type, the power over long range time period will be reduced.

SUMMARY OF THE INVENTION

Therefore, one object of the present invention is to provide a power management method for saving power taking into account a running application.

Another object of the present invention is to provide a power management method for saving power within the minimum deterioration of usability.

A further object of the present invention is to provide a power management method for the reduction over the long range time period.

A further object of the present invention is to provide a new structure of a program that preforms power management.

To achieve the above objects, the present invention comprises: a resource manager for examining a running application and a usage status of an examination object device; and a policy manger for receiving, from the resource manager, information about the running application and the usage status of the examination object device, and for selecting a job type corresponding to the information, in a plurality of job types predetermined for the running applications. The resource manager receives, from the policy manager, the selected job type, and sets a parameter of a control object device thereinto. The parameter of the control object device is predetermined for the selected job type. Since the policy of the power management is defined for each running application, a more detailed power management process is performed to reduce the power consumed by the entire system. Further, a new structure of the program is provided in which the resource manager and the policy manager are divided functionally. A job type reported by the policy manager may be a job type name or a set of operating modes of the control object device.

The job types may include a job type for which the power consumed by the entire computer is increased by setting the parameter corresponding to the job type, into the control object device. Although it seems counter to the principle of power saving, taking the long view, it is better in some cases that the processing of a large quantity of data is terminated in as short period of time as possible.

In addition, in response to the change of the job type by the policy manager, the resource manager may notify a user of the change. As a result, notification of a reduction in the LCD luminance, etc., may be given in advance, so that usability is improved.

The computer may include a battery, so that the resource manager can examine the battery to determine the remaining power while the policy manager can determines a job type while taking into account the remaining battery power and the desirable operating duration specified by a user. How much battery power remains is particularly important for a portable computer, and if power can be consumed in accordance with a desirable operating duration, usability can be enhanced.

Although the present invention has been explained from the viewpoint of program modules, it is possible to perform the processing steps of the programs in another implementation. The programs can be stored on a storage medium such as a CD-ROM, and a floppy disk, which is distributed in the market.

DESCRIPTION OF THE PREFERRED EMBODIMENTS

Figure 1:
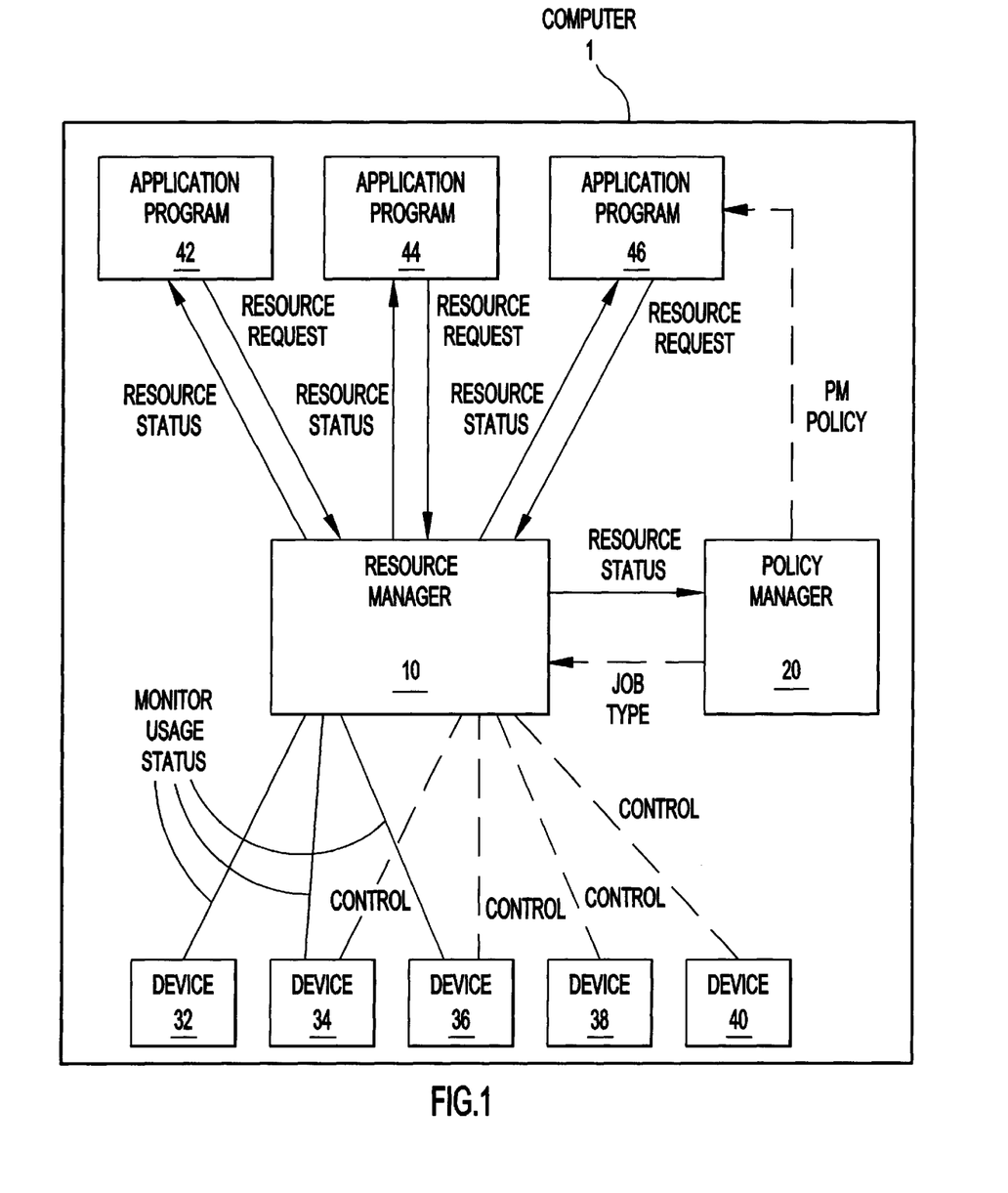
FIG. 1 is a block diagram illustrating an example arrangement of a computer according to the present invention.

An example arrangement of a computer 1 according to the present invention is shown in FIG. 1. Devices 32 to 40 are devices, such as a CPU, a hard disk drive (HDD), an LCD, and a VRAM. A portable computer can include a battery as one of these devices. Application programs 42 to 46 are a communication program, a word processor software, and a moving image reproduction software, etc. A resource manager 10 monitors the usage status of necessary devices selected from among the devices 32 to 40, and sets parameters of the devices as needed. The resource manager 10 monitors the execution conditions of the application programs 42 to 46. The policy manager 20 receives information concerning the device usage statuses and the application program running states acquired by the resource manager 10, and identifies a predefined job type. The job type represents the usage status of each device defined for each application. The application can be an individual application program, or a group of the same type of application programs.

The job type identified by the policy manager 20 is output to the resource manager 10, which sets parameters of devices corresponding to the job type, into each device. Devices for which parameters are set may or may not overlap devices for which usage status is monitored. It is also possible that for each application devices to be monitored and devices to be controlled may either be different or be the same.

Figure 2:
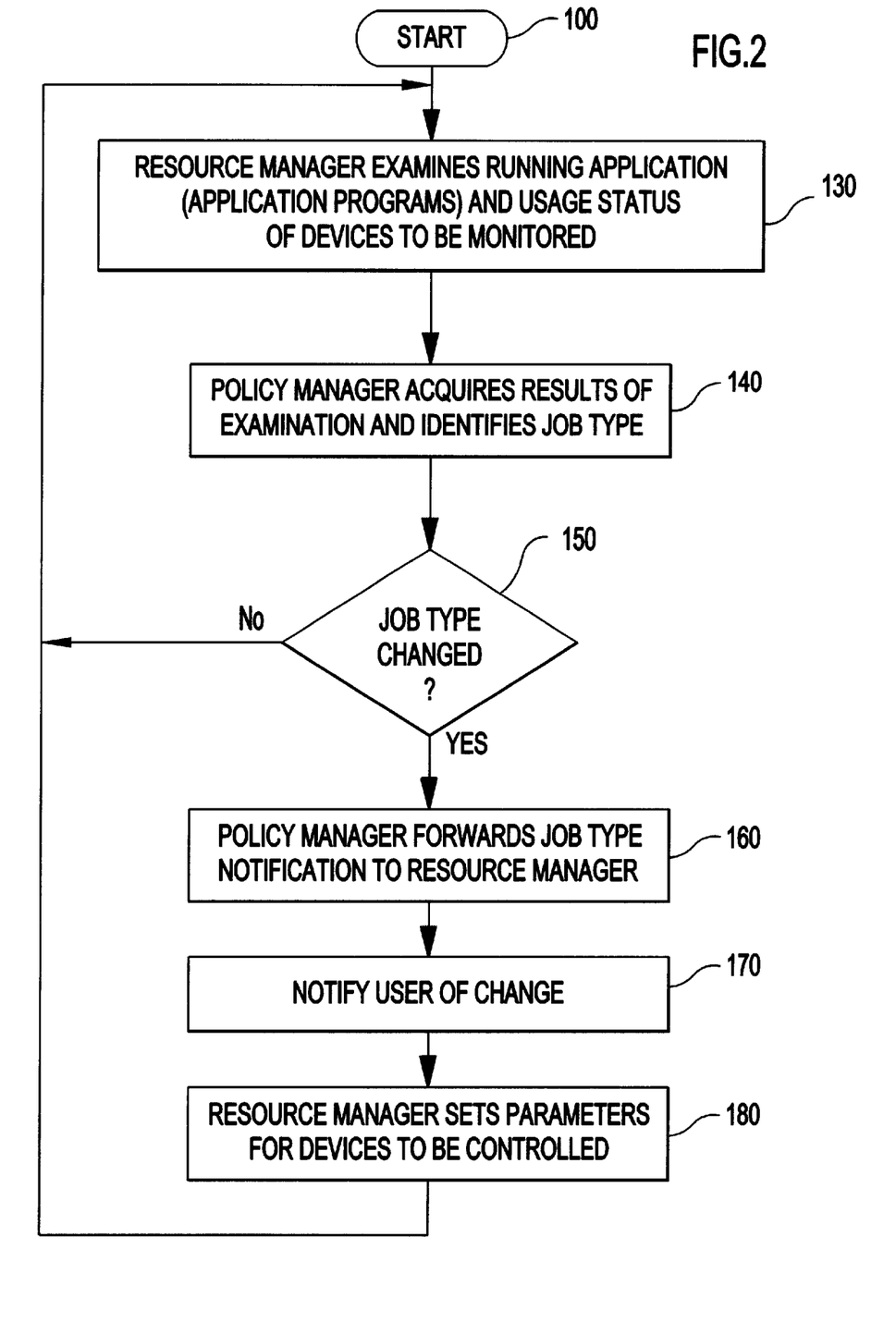
FIG. 2 is a flowchart for the processing performed by the present invention.

FIG. 2 shows the outline of the processing performed with the arrangement in FIG. 1. The resource manager 10 examines a running applications and the usage status of devices to be monitored (step 130). This examination is performed for a predetermined period of time. The policy manager 20 acquires the result of the examination, and identifies the job type (step 140). If there is no change in the job type, program control returns to step 130 (step 150). If there is a change in the job type, the policy manager 20 transmits the job type to the resource manager 10 (step 160), and the policy manager 20 notifies the user of the job type change (step 170). Since it may be inconvenient for a user to always be reported the change of the job type, it is possible for the process at step 170 to be performed only when a change has a great impact on the usability. It is also possible for a change of the job type not to be reported to a user at all. The notification of the change to a user may be displayed on the screen, or alerted by a beep sound, etc. The resource manager 10 sets parameters corresponding to the job type to devices to be controlled (step 180).

The effect obtained by power saving can be demonstrated by repeating the above process. The functions of the resource manager 10 and the policy manager 20 will now be described in detail.

(1) Resource Manager 10

(a) Function for Acquiring a Usage Status of Each Device

The usage status of a device basically can be obtained by examining the I/O access frequency and the load. When an interface for notifying the usage status of devices is provided between an OS and an application program, the detailed usage status of the devices can be acquired. For example, in a case of a modem, not only the ON/OFF state of the device, but also requests by an application program, such as a request for communication status, can be obtained.

When the application program has an interface for notifying the usage status of the devices, the resource manager 10 obtains the usage status of the devices by acquiring information transmitted from the application program to the OS. In the example shown in FIG. 1, such an interface, is deployed. The resource manager 10 receives resource requests from one of the application programs 42 to 46, and returns the resource conditions to the application program. In addition, the resource manager 10 receives a device usage request in advance from the application program, and initializes and sets up the device so that it can be used without any delay.

If the application program does not have an interface for notifying the usage status of devices, a method can be employed for monitoring directly the frequency of the accesses to the devices.

Example parameters to be monitored of the examination (or monitor) object devices will now be explained.

* CPU

A performance required for applications can be obtained by monitoring a load imposed on the CPU. The numbers of memory accesses and I/O commands, the numbers of executed commands, and the FLOPS (Floating-point Operations Per Second) are measured.

* Keyboard/mouse

The presence or absence of user interaction is determined by observing the input frequency.

* HDD

The frequency of accesses is obtained for a predetermined period of time, so that whether an application will access the HDD can be determined. An access can be predicted by employing the statistics of the access frequency. Whether accesses are mainly for WRITEs or for READs is also an element to be observed.

* Serial/parallel Port

In a case of a modem, for example, whether or not the communication is performed is determined by monitoring the access frequency, and the volume of the transferred data is monitored to determine the load of the communication. Sometimes, the direction of the transferred data is also required.

* CD-ROM (DVD Drive)

The access frequency is monitored to determine the necessity of the access.

* Decoder Chip (e.g., MPEG Chip)

The usage status of the chip is monitored to determine what decoding method is used.

* Others

When an optical sensor is provided, the quantity of light in the vicinity of an apparatus is employed to determine whether the apparatus is being operated indoors or outdoors. When an infrared sensor is mounted, the presence or absence of a user is determined.

(b) Function for Acquiring a Currently Running Application

It is easy to acquire which application program is being executed so long as an application program has an interface for notifying the usage status of the device. Even when an application program does not have the interface, an OS normally knows which application program is being executed. The information concerning the running application program can be used.

When only one application program is being executed, it is easy to detect it by using the above method. However, when a plurality of application programs are being executed under a multi-task OS, which application program is the primary application being executed is determined. In this case, an application program associated with a window that is in the front most can be determined to be the primary running application, or the occupation ratio of the CPU load can be detected to determine the primary running application program. Further, an application group can be selected from a plurality of application groups by taking into account all executed application programs.

(c) Parameter Setups of Each Device to be Controlled

The resource manager 10 first obtains the list of devices having a controllable power saving function, and the control methods (operating modes). When power saving function for a device can be controlled, its operating modes defined for it are controlled. The type of the device and the operating mode may be transmitted to the policy manager 20. In this case, since the policy manager 20 designates the operating mode, parameters corresponding to the operating mode are set to a device to be controlled. Also, the policy manager 20 can report the name of the job type. In this case, when the job type is correlated in advance with the operating modes of devices to be controlled, and specific hardware parameters corresponding to the operating mode are stored, power management as designated by the policy manager 20 can be performed.

When the name of the job type is received, for example, a table which stores the names of devices to be controlled with their appropriate addresses and parameter values. When a device to be controlled is also designated with its operating mode, a table for storing its operation modes and parameter values that are to be set in accordance with its operating mode is prepared for each device to be controlled.

(2) Policy Manager 20

(a) Determination of Job Type

First, the policy manager 20 determines a running application. Data concerning the running application is also acquired from the resource manager 10. As previously mentioned, when a plurality of application programs are being executed by the multi-tasking OS, the primarily executed application is determined. This determination may be performed by either the resource manager 10 or the policy manager 20. The previously described determination method is employed.

Next, the job type for the running application is determined. Assuming that devices to be monitored are $D_1$, $D_2$, $D_3$, ... and $D_N$ and that the index for the usage status of a device $D_i$ is defined as $I_{Di}(t)$, the function of time t, in N-dimensional coordinate space $I_{Di}$ (i=1, 2, ... N) is defined for each time t. This coordinate space is called a job type space. The individual points in the N-dimensional space represent the usage status of the devices. For example, if devices to be monitored are a CPU, a keyboard and a VRAM, the job type space is a three-dimensional coordinate space that consists of three parameters, an average CPU load, a keyboard input frequency and VRAM access frequency. The index that reflects the characteristics of the device, such as current setup values, average values for a past predetermined period of time, or adjusted values weighted with the past hysteresis, must be selected as the index for the usage status of the device.

To identify the job type, it is not practical to define a job type for all the points in the N-dimensional space. Actually, the N-dimensional space is divided into a plurality of blocks, and a job type is assigned for each block. While taking into account the characteristics of the running application, the threshold value for each axis of the N-dimensional space can be provided in detail, if necessary, or can be just the presence or absence of accesses for the parameters that are not very important. Naturally, the characteristics of the devices must be taken into account.

As a result, the job type can be identified by determining in which block a point in the N-dimensional space is included at a specific time.

(b) Policy Determination of Power Management

The policy of the power management differs for each job type. It is necessary, therefore, to determine for each job type a device to be controlled and an operating mode to be shifted. When the policy manager 20 identifies the job type, it acquires the policy governing power management defined as corresponding to that job type, and transmits the policy to the resource manager 10. Specifically, the policy manager 20 designates one of the operating modes of devices to be controlled, which are received from the resource manager 10, and transmits the operating mode to the resource manager 10. As a result, the policy manager 20 can virtualize a portion that depends on the hardware, and can determined the policy at the abstract device level.

An example basic policy for controlling control object devices will now be described.

* CPU

When the requested performance is low, the clock frequency of a CPU is reduced. When a load is extremely low, the power saving of peripheral devices, such as an LCD and an HDD, may be possible. Power consumption by a specific device may be reduced in accordance with the type of commands and accessed memory region.

* Keyboard/mouse

If there is no interaction with a user, it is assumed that a user is not present or is not operating, and (1) the luminance of the LCD can be reduced or (2) the power provided to the peripheral devices can be saved.

* HDD

When there is no disk access, the rotation of the disk is halted. When an access is predicted while the disk is halted, the disk is activated in advance. If the loading of an application program, the reading of a file, and automatic saving are detected in advance, the power consumed by the peripheral device can be reduced.

* Serial/parallel Port (for Modem)

When no communication is performed, a modem is powered off, or its operating mode is changed to a power saving mode, and the LCD/HDD may be powered off. Also, when the volume of transferred data is small, the HDD can be powered off.

* CD-ROM/DVD Drive

A drive is halted when drive access is not required.

* Decoder Chip

When decoding is performed by using a decoder chip, the load imposed on the CPU may be reduced.

* Others

When a user is absent, an LCD can be turned off. If the apparatus is installed indoors, the luminance of the LCD can be reduced.

The determined policy is transmitted to application programs, as needed, or when the program can respond to the notification. The application program can then issue a resource request in accordance with the policy. Since the application program is able to acquire the operating environment, when the remaining power capacity is small or when the current processing capability is nearing its limit, an unnecessary job or a job that can be omitted is suspended or delayed until it is required, or until there is stable supply of power from an AC source. If there is sufficient processing capability, various additional processes for enhancing usability can be activated. That is, the application program can regard power as one of resources, and can change its processing in accordance with the power supply state. The target to be controlled at this time is processing functionalities provided by devices or programs.

In a condition where the least power is supplied, the device is powered on only when it is used, so that while consumed energy is reduced, it is at the cost of performance. On the other hand, in a condition where sufficient power is supplied, the devices are constantly in the ON states, and performance has priority.

The minimum set of functionalities of a program is recommended to be provided when only the minimum power is supplied. In some cases, unnecessary background processes are halted by providing a display other than a WYSIWYG (What You see Is What You Get) one, or a display with lower luminance, and only a subset of the original functionalities needs to be provided.

Upon receipt of the current operating condition of the system and the control policy, an application program adjusts the usage status of unnecessary devices or of functions. In addition, in accordance with the situation, the application program takes into account a subset of the original functions or required devices, and the sacrifice of the device access performance. As a result, the unnecessary devices are effectively released, and therefore the control policy becomes consistent. The result may be further enhance the effect of the control policy.

(c) Handling When the Job Type is Changed

When the job type is changed, it should be reported to a user. For example, when a calculation is completed or a dialogue box for requesting input is displayed while the backlight of the LCD is off, this event must be reported to a user. In this case, a process is performed for returning the luminance of the LCD to the default value, or for generating a beep. In this embodiment, the policy manager 20 performs such a process, but the policy manager 20 may instead determine that a notification process should be performed, and the resource manager 10 then perform the process.

The objects of the present invention can be achieved with the above described arrangements of the resource manager 10 and the policy manager 20. An example application will now be described.

(3) Communication Application

A communication application has become important, and is very frequently employed with the popularity of the Internet. The present invention can effectively perform power saving when the communication application is being executed.

(a) Definition of Job Types

The job types are defined as follows by employing five parameters: average load $I_{D1}(t)$ imposed on a CPU for the past five seconds; keyboard input frequency $I_{D2}(t)$ for the past five seconds; data quantity $I_{D3}(t)$ transferred to a communication buffer for the past five seconds; data quantity $I_{D4}(t)$ transferred to a hard disk for the past five seconds; and the ON/OFF/standby state $I_{D5}$ of a modem.

The job types are classified into A. communication job and B. non-communication job in accordance with the ON/OFF state of the modem. It should be noted that the non-communication job is not considered in this embodiment. The A. communication job is sorted as follows in accordance with the other four indexes.

TABLE 1

| Job Type | CPU Load | Key Input Frequency | Communication data | Data volume of disk transfer |
|---|---|---|---|---|
| Light Communication | $I_{D1} < 10$ (%) | Yes | $I_{D3} < 1$ (KB/s) | $I_{D4} = 0$ (KB) |
| Normal Communication | $10 \leq I_{D1} \leq 25$ (%) | Yes | $1 < I_3 < 10$ (KB/s) | $I_{D4} < 100$ (KB) |
| Heavy Communication | $10 \leq I_{D1} 25$ (%) | Yes | $I_{D3} \geq 10$ (KB/s) | $I_{D4} \geq 100$ (KB) |
| High Load | $I_{D1} \geq 50$ (%) | Yes | $I_{D2} \geq 0$ (KB/s) | $I_{D3} > 1$ (KB) |
| Browsing | $I_{D1} < 10$ (%) | Yes | $I_{D2} = 0$ (KB/s) | $I_{D3} = 0$ (KB) |
| Download | $I_{D1} < 10$ (%) | No | $I_{D2} > 10$ (KB/s) | $I_{D3} \geq 1$ (KB) |
| Waiting | $I_{D1} < 10$ (%) | No | $I_{D2} = 0$ (KB/s) | $I_{D3} = 0$ (KB) |

(b) Property of Each Job Type

* Light Communication

This job places only a small load on a CPU and only a small quantity of data is transferred. The job in looking at a text based Web page or in exchanging e-mail on the command prompt corresponds to this job type. Since little job performance is required for the CPU, the clock frequency can be reduced to the minimum. However, the screen display is a major job, and it is not preferable that the luminance of the LCD is reduced. On the other hand, as the quantity of data involved is extremely small, and as almost no disk accesses are required, the hard disk may be halted.

* Normal Communication

In this job, a little greater load is placed on the CPU, and the quantity of data transferred is also a little larger. The job in looking at a Web page that includes a relatively small color image corresponds to this job type. Since the quantity of data transferred is large, the hard disk is frequently accessed and used as a swap area, and halting the disk would result in deterioration of usability. Accordingly, since the CPU performance is not so small, an intermediate clock frequency is needed.

* High Load

The load placed on the CPU is large, regardless of the quantity of communication data or the quantity of data transferred from the hard disk. A case where a Web page is described using Java (a trademark of Sun Microsystems) and a Java applet is activated corresponds to this job type. Since a lot of CPU performance by the CPU is required, as high a clock frequency as possible is needed. However, the hard disk may be halted since in many cases it need not be used (note that when the quantity of communication data is large, however, the hard disk is not halted).

* Browsing

In this job type, there is an interaction with a user, while a small load is placed on the CPU and the quantity of communication data is very small. A case where after all necessary files are downloaded, data are edited or another operation is performed corresponds to this job type. The basic setup is the same as that for light communication. The modem may be set to standby if possible.

* Download

In this job, while there are no user interactions, the quantity of communication data and the quantity of data at the disk accesses are large. The downloading of a large file corresponds to this job type. Since no user interaction is necessary, the LCD is turned off. Only the hard disk need to be working and only a minimum CPU performance is required.

* Waiting

Not only a small load is placed on the CPU and there are no communication data and no disk accesses, but also there are no user interactions. A congested network state and a connection wait state when accessing to a remote site correspond to this job type. The basic setup is the same as for browsing. The LCD may be turned off.

In accordance with the definitions for job types described above, the individual devices are controlled as follows.

(c) Setting of Power Saving for Each Job Type

TABLE 2

| Job Type | CPU Clock | LCD Luminance | HDD timer | Modem |
|---|---|---|---|---|
| Light Communication | 12.5% | 75% | 0 min. (immediate stop) | On |
| Normal Communication | 25% | 75% | 0 min. (immediate stop) | On |
| Heavy Communication | 50% | 75% | 1 min. | On |
| High Load | 75% | 75% | 0 min. (immediate stop) | On |
| Download | 12.5% | 0% | 1 min. | On |
| Browsing | 12.5% | 75% | 0 min. (immediate stop) | Standby |
| Waiting | 12.5% | 0% | 0 min. (immediate stop) | On |
| Non-Communication Job | 50% | 75% | 3 min. | Off |

(4) Multimedia Application

A multimedia application using an MPEG decoder is employed as another example.

(a) Definition of Job Types

The job type is defined as follows by employing drive access frequency $I_{D1}(t)$, the average CPU load $I_{D2}(t)$ during drive access, and an operating condition $I_{D3}(t)$ for an MPEG decoder.

TABLE 3

| Job Type | Drive Access Frequency | CPU Load | Decoder Use |
|---|---|---|---|
| Non-Play | No | $I_{D2} < 25$ (%) | Unused |
| Light Play | Yes | $I_{D2} < 25$ (%) | Unused |
| Heavy Play | Yes | $I_{D2} \geq 25$ (%) | Unused |
| H/W Decoder Play | Yes | $I_{D2} \geq 25$ (%) | Used |

(b) Property of Job Type

* Non-Play

In this type, there is no drive access and actual reproduction has not yet been performed, even though an application is running. Since the drive is not necessarily being operated, the hard disk is halted until an access request is issued. Not only the rotation of the hard disk but also the rotation of a storage device, such as a CD-ROM drive or a DVD drive, is halted.

* Light Play

While there are drive accesses and multimedia software is being reproduced, the load placed on a CPU is not very large. The reproduction of music corresponds to this job type. Since little CPU performance is required, an intermediate or a low clock frequency is sufficient.

* Heavy Play

There are drive accesses and the load placed on a CPU is relatively high. The reproduction of moving pictures recorded on a video CD, etc., corresponds to this job type. Since CPU performance is required, a high clock frequency must be set.

* Hardware Decode Play

In this job, drive accesses are performed and an MPEG decoder is also operated. The MPEG decoder is only employed as an example in this embodiment, and another decoder may be employed. Since data processing is performed by a hardware MPEG chip, the required CPU performance may be slightly reduced.

(c) Settings of Power Saving for Each Job Type

It is preferable that the following control is performed when the job types are defined as described above.

TABLE 4

| Job Type | Drive Operation | CPU Clock |
|---|---|---|
| Non-Play | Off | 12.5% |
| Light Play | On | 25% |
| Heavy Play | On | 75% |
| H/W Decoder Play | On | 25% |

The resource manager 10 and the policy manager 20 perform the above described processing. In Tables 3 and 4, job types that apparently increase required energy are included. Furthermore, delicate control, such as no supply of power to or no power consumed at an unnecessary portion, can be performed. The policy manager 20 can perform the additional functions below.

(5) Setting of Operating Duration by User

In a battery-operated portable computer, the maintenance of battery power is required during an operating duration specified by a user. Power saving is performed by performing the above described control to extend the battery operating period; however, a predicted battery operating duration may be shorter than the operating duration specified by a user. In this case, some countermeasures must be considered, and when a user sets a long operating duration, he or she accepts some usability deterioration.

Figure 3:
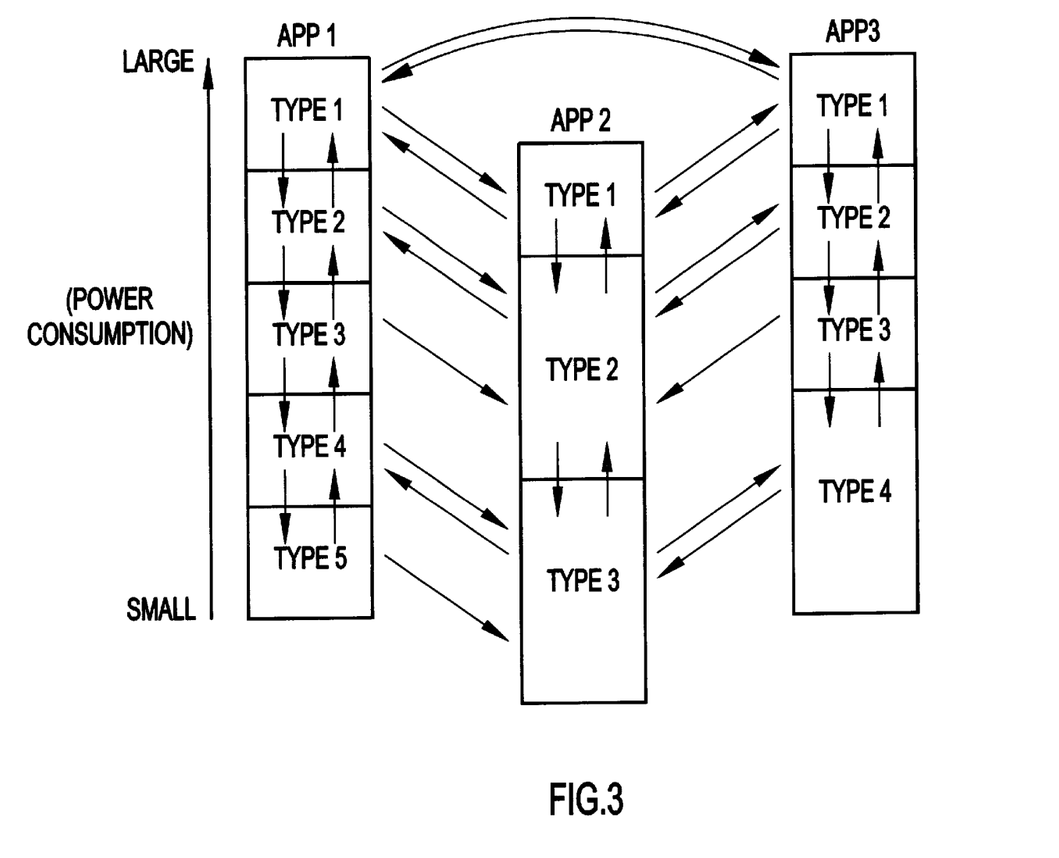
FIG. 3 is a diagram for explaining a method for coping with a setup for the operating duration.

From the above viewpoint, as shown in FIG. 3, job types that are defined for individual applications (App1, App2 and App3) are arranged in descending order as regards power consumption. States are shifted horizontally when switching applications, and vertically (especially downward) when responding to the operating duration specified by a user. A detailed explanation will be given referring to FIG. 4.

When, for example, a computer is started, or when a special setup action is performed by a user (step 200), a default job type is temporarily set (step 210), and the target operating hours T0 requested by the user for consequent use are set. When the processing was terminated earlier than the expiration of the operating duration that was set to the preceding session, as the remaining time can be employed, a determination is made as to whether or not the remaining time will be used (step 220). When the remaining time is to be used, it is set (step 240). When a new time is to be set, the setting is performed at step 230. The resource manager 10 examines the remaining battery power, and determines whether or not the currently remaining battery power is sufficient for the specified operating duration (step 250). If the specified operating duration is too long, an alarm is generated (step 340), and though not shown in FIG. 4, program may return to step 230. In this embodiment, the above described process for identifying the job type is performed (step 350), and if the job type is changed (step 360), the resource manager 10 is instructed to change the operating mode to a new job type (step 370). If there is no change in the job type, it is checked whether or not the power is off (step 380). If the power is not off, the process at step 350 and the following steps is repeated. In other words, the specified operating duration is ignored. When the power is off, the process is terminated (step 330).

Figures 4, 4A:
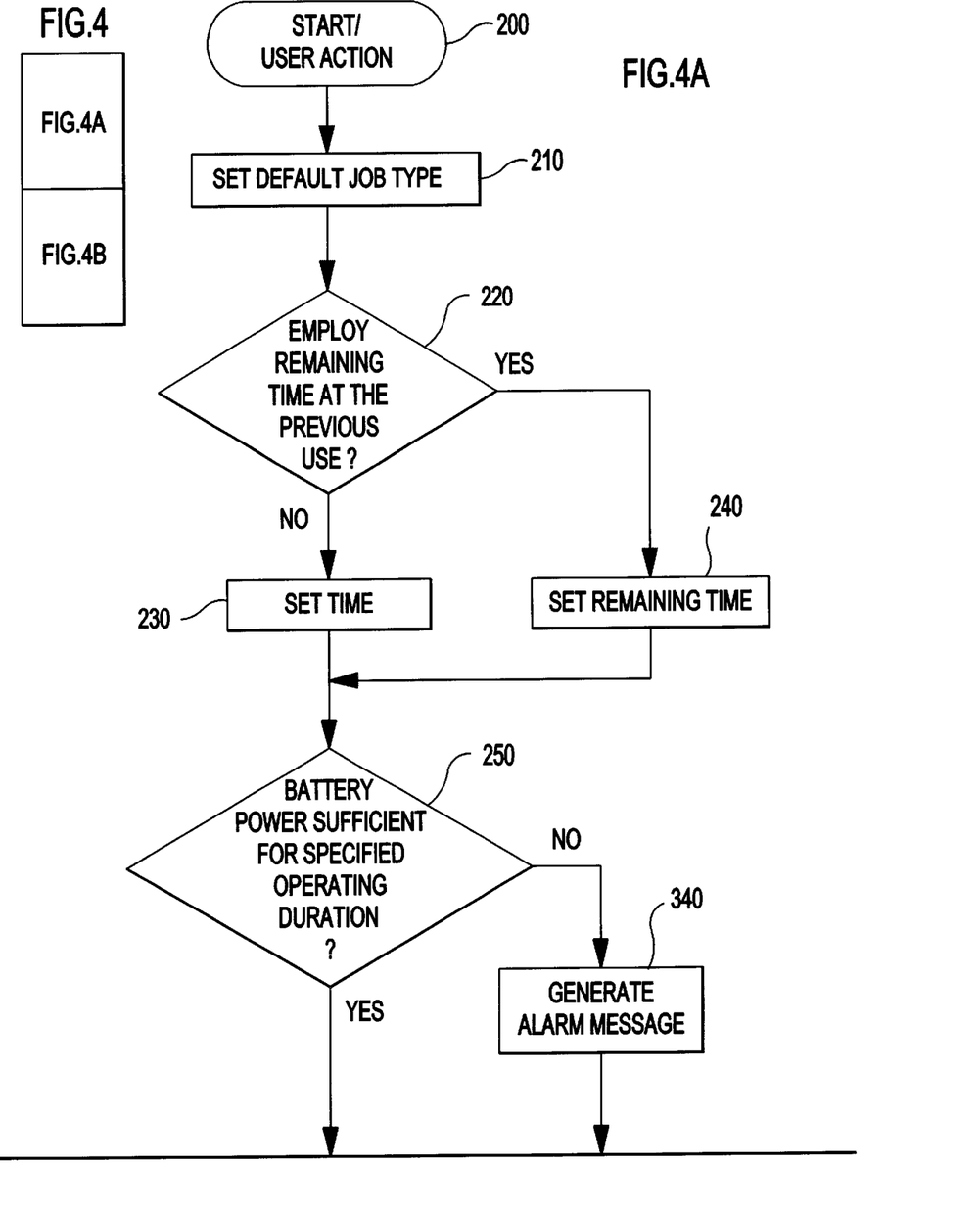
FIG. 4 is a flowchart for coping with a setup for a drive time.
Figure 4B:
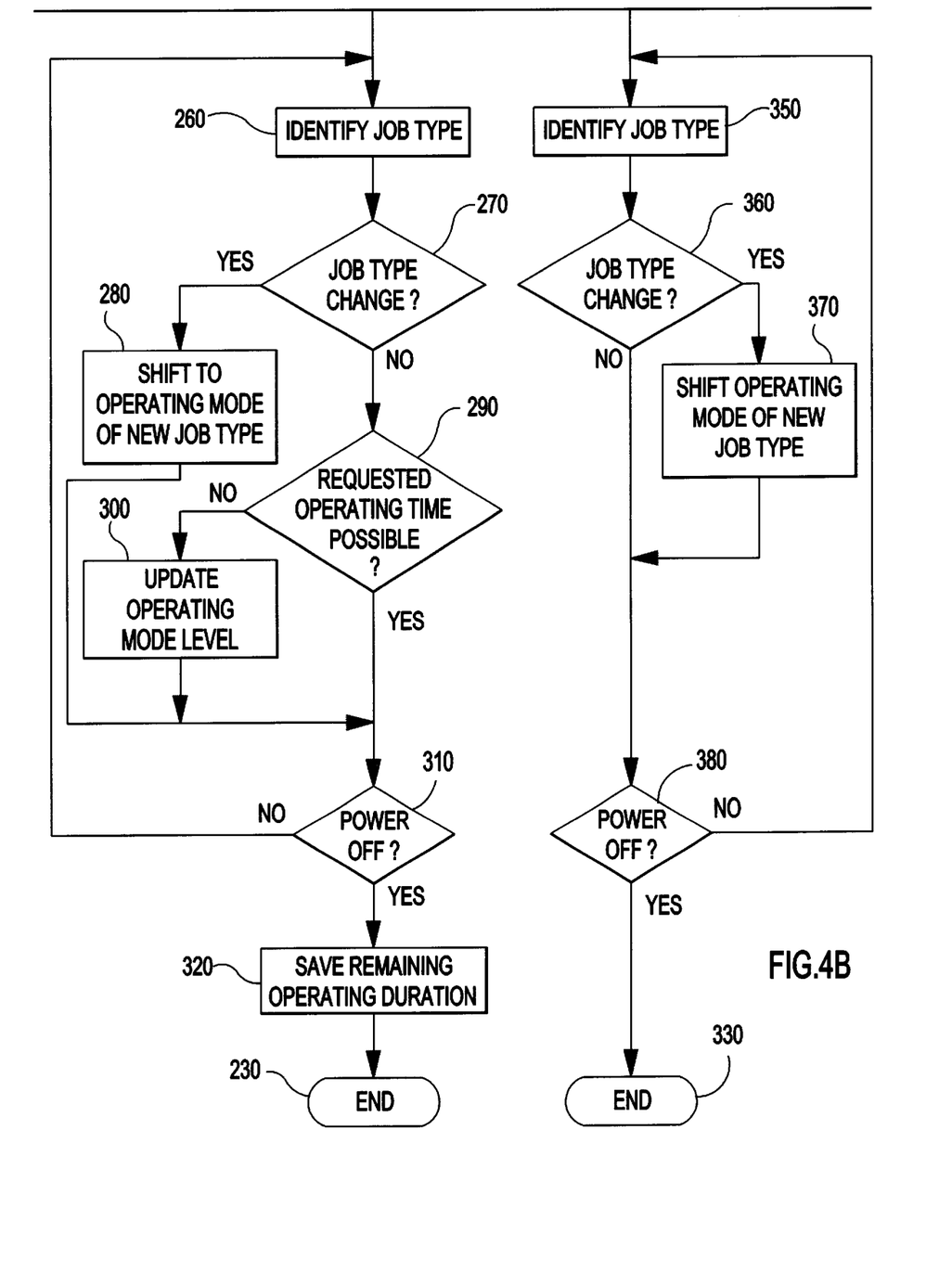

When the available current battery remaining power is sufficient for the specified operating duration, the above described job type identification process is performed (step 260). When the job type is changed (step 270), the resource manager 10 is instructed to change the operating mode to a new job type (step 280). If there is no change in the job type, it is checked whether the requested operating duration is possible (step 290). If the remaining battery power is denoted by B(t), the current time is $t_i$, and a permissible error of the consecutive operating duration is Te(B), the function of the remaining battery power, this determination is performed by employing the following expression. It should be noted that Te(B) is a function that is decremented in correspondence with the reduction of B.

$$\left(\frac{dB(t)}{dt}\bigg|_{t=t_1} < \frac{B(t_i)}{ToTet_i}\right) \quad \text{[Expression 1]}$$

Figure 5:
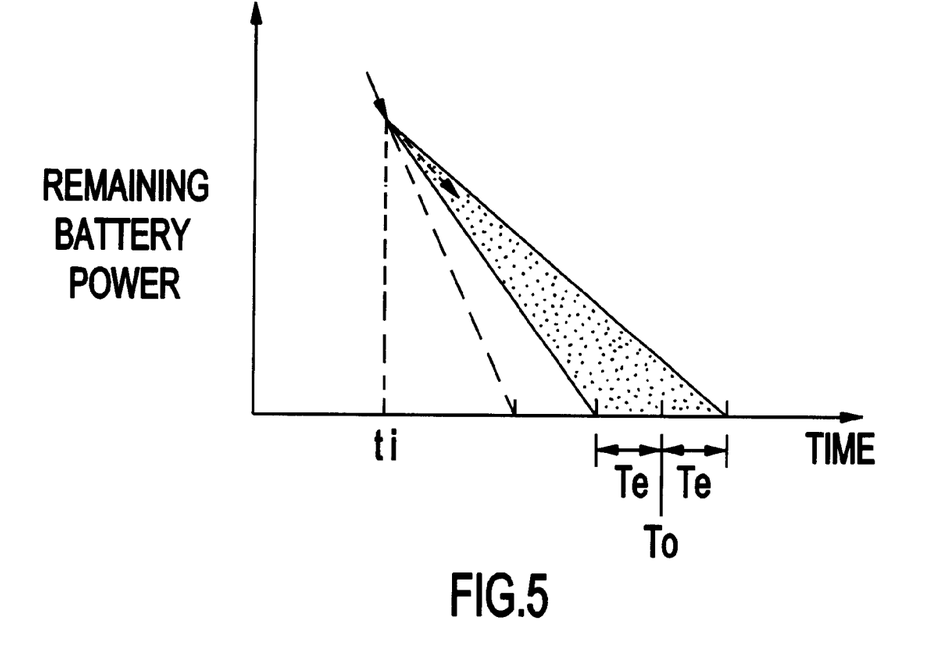
FIG. 5 is a graph for explaining the decrease of battery power.

When the condition in the expression (1) is satisfied, the job type is changed to one of the same application that consumes less power. As shown in FIG. 5, when power is consumed along the line indicated by the arrow with the solid shaft line, the operating duration T0 specified by a user can not be attained. Therefore, the tendency of the consuming energy is altered as indicated by the arrow with the broken shaft line and the job type is changed, so that the required energy falls within a permissible error range of the consecutive duration (step 300).

When the following expression is satisfied, the job type can be changed to one of the same application that consumes more power.

$$\left(\frac{dB(t)}{dt}\bigg|_{t=t_1} > \frac{B(t_i)}{ToTet_i}\right) \quad \text{[Expression 2]}$$

Figure 6:
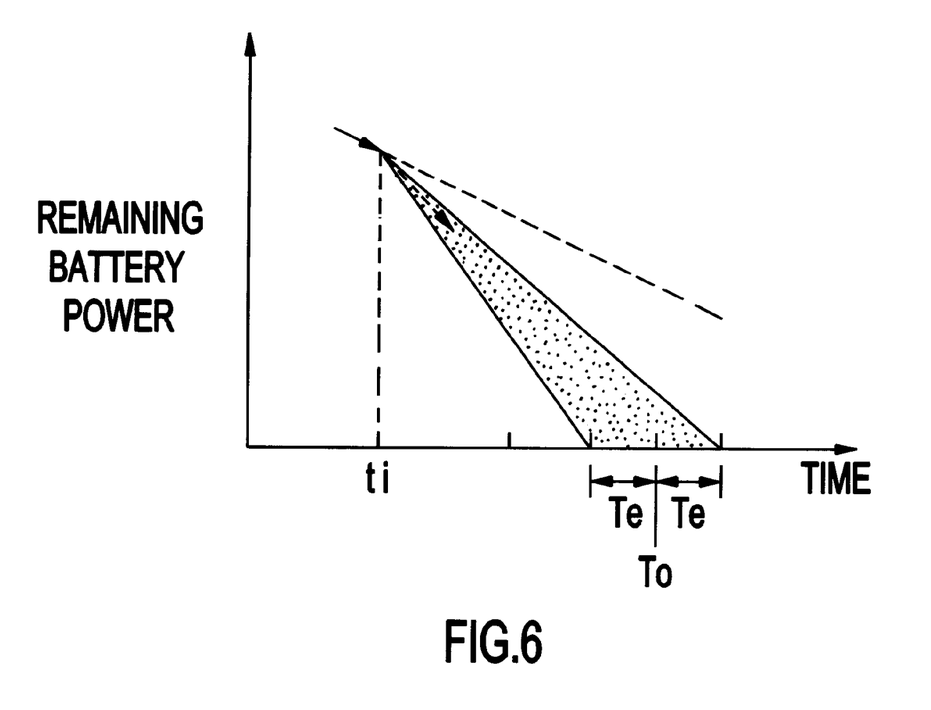
FIG. 6 is a graph for explaining the decrease of battery power.

As shown in FIG. 6, when the power is consumed along the line indicated by the arrow with the solid shaft line, the drive time further exceeds the drive time T0 specified by a user. The usability has priority, and the power consumption is changed as indicated by the arrow with the broken shaft line, and thus falls within a permissible error range of the consecutive operating duration (step 300).

When both of the expression 1 and 2 are satisfied, the operating duration T0 specified by the user can be attained, and no change is necessary. It is checked whether the power is off (step 310), and if the power is off, the remaining operation time is saved (step 320). The process is thereafter terminated (step 330). If the power is not off, program control returns to step 260.

With the above arrangement, the policy manager 20 can be provided that can cope with the operating duration specified by a user. In this case, since the definition of the job type may be slightly changed, it is better to determine in advance whether the job type can cope with the operating duration specified by a user.

Although the present invention has been explained using only one embodiment, various modifications of the present invention are possible. For example, an single task apparatus can perform more effective power management by providing resource manager and policy manager functions for an application program. The job types may be set by a designer or by a user.

The present invention can provide a power management method for saving power taking into account a running application.

The present invention can provide a power management method for saving power within the minimum deterioration of usability.

The present invention can provide a power management method for the reduction over the long range time period.

The present invention can provide a new structure of a program that preforms power management.

What is claimed is:

1. A power managed computer comprising:
   a plurality of controlled object devices each consuming electrical power in accordance with a corresponding control parameter;
   a resource manager for identifying a currently running application and for determining a current usage status for each one of said controlled object devices;
   a policy manger for receiving, from said resource manager, information identifying said currently running application and said current usage status of said controlled object devices, and for identifying a current job type corresponding to said information from a plurality of job types defined with respect to said information; and
   said resource manager receiving, from said policy manager, the identified current job type, and setting a predetermined one of said control parameters to a predetermined value corresponding to said identified current job type, thereby controlling the power consumed by said computer in accordance with said identified current job type.

2. The computer according to claim 1, wherein said plurality of job types include a job type for which the power consumed by said computer is increased by setting said predetermined one of said control parameters to the predetermined value corresponding to said identified current job type.

3. The computer according to claim 1, wherein, in response to said policy manager changing said current job type, said resource manager notifies a user of the change.

4. The computer according to claim 1, further comprising a battery, wherein said resource manager examines the remaining power of said battery, and said policy manager identifies a current job type by taking into account the remaining power of said battery and an operating period specified by a user.

5. A method for setting a parameter of a controlled object device in a computer having a storage device, said storage device storing a job type definition with respect to each of a plurality of applications and a parameter of said controlled object device corresponding to each of the job types, comprising the steps of:

identifying a current running application of said computer;

examining a current usage status of an examination object device;

determining said job type by using said current running application and said current usage status of said examination object device;

acquiring said parameter of said controlled object device corresponding to said determined job type; and setting said acquired parameter to said controlled object device.

6. The method according to claim 5, further comprising the step of:

notifying a user of a change of said job type after said determining step.

7. A storage medium storing a program for performing power management of a computer, said program comprising the steps of:

defining a job type for each of a plurality of applications;

defining a parameter of a controlled object device corresponding to each said job type;

identifying a current running application of said computer;

examining a current usage status of an examination object device;

determining said job type by using said current running application and said current usage status of said examination object device;

acquiring a parameter of a controlled object device corresponding to said determined job type; and setting said acquired parameter to said controlled object device.

8. A storage medium storing a program for performing power management of a computer, said program comprising:

a resource manager program for examining a running application and a usage status of an examination object device;

a policy manger program for receiving, from said resource manager program, information about said running application and said usage status of said examination object device, and for selecting a job type corresponding to said information, from among a plurality of job types predetermined for the running applications; and said resource manager program receiving, from said policy manager program, the selected job type, and setting a parameter of a controlled object device thereinto, said parameter of said controlled object device being predetermined for the selected job type.

* * * * *